US010425352B2

(12) United States Patent
Barzik et al.

(10) Patent No.: US 10,425,352 B2
(45) Date of Patent: Sep. 24, 2019

(54) POLICY DRIVEN STORAGE HARDWARE ALLOCATION

(71) Applicant: INTERNATIONAL BUSINESS MACHINES CORPORATION, Armonk, NY (US)

(72) Inventors: Zah Barzik, Rishon LeZion (IL); Lior Chen, Jerusalem (IL); Michael Keller, Haifa (IL); Rivka M. Matosevich, Zichron-Ya'acov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 589 days.

(21) Appl. No.: 14/641,793

(22) Filed: Mar. 9, 2015

(65) Prior Publication Data
US 2016/0269317 A1    Sep. 15, 2016

(51) Int. Cl.
*H04L 12/927* (2013.01)
*H04L 29/08* (2006.01)
*H04L 12/911* (2013.01)

(52) U.S. Cl.
CPC ............ *H04L 47/805* (2013.01); *H04L 67/10* (2013.01); *H04L 47/822* (2013.01)

(58) Field of Classification Search
CPC ... H04L 67/1002; H04L 43/08; H04L 47/805; H04L 41/0806; H04L 43/16; H04L 47/78; H04L 67/10; H04L 47/822
USPC ........................................................ 709/226
See application file for complete search history.

(56) References Cited

U.S. PATENT DOCUMENTS

| 8,156,163 | B1 | 4/2012 | Hamilton et al. |
| 8,185,779 | B2 | 5/2012 | Devarakonda et al. |
| 8,886,910 | B2 | 11/2014 | Mehra et al. |
| 9,292,216 | B1 * | 3/2016 | McGrath ............... G06F 3/0689 |
| 9,772,866 | B1 * | 9/2017 | Aron ................... G06F 9/45558 |

(Continued)

OTHER PUBLICATIONS

Lelii, Sonia R., "HDS Takes Aim at EMC, IBM", Oct. 1, 2004, 3 pages, InfoStar, http://www.infostor.com/index/articles//display/214683/articles/infostor/volume-8/issue-10/news-analysis-trends/hds-takes-aim-at-emc-ibm.html.

(Continued)

*Primary Examiner* — William G Trost, IV
*Assistant Examiner* — Imran Moorad
(74) *Attorney, Agent, or Firm* — Griffiths & Seaton PLLC (57) ABSTRACT

Methods, computing systems and computer program products implement embodiments of the present invention that include assigning multiple storage resources to a reserve pool, and defining one or more storage policy parameters that include allocation policies and deallocation policy parameters. A software defined storage (SDS) controller is initialized by allocating, from the reserve pool, one or more of the storage resources to the SDS controller, and a current state of the SDS controller is monitored. In a first embodiment, upon detecting that the state of the SDS controller meets a given allocation policy parameter, an additional storage resource from the reserve pool is allocated from the reserve pool to the SDS controller. In a second embodiment, upon detecting that the state of the SDS controller meets a given deallocation policy parameter, a given the SDS controller is deallocated from the SDS controller and released back to the storage pool.

20 Claims, 3 Drawing Sheets

(56) References Cited

U.S. PATENT DOCUMENTS

| | | | | |
|---|---|---|---|---|
| 2004/0243699 | A1* | 12/2004 | Koclanes | H04L 29/06 709/224 |
| 2008/0059972 | A1* | 3/2008 | Ding | G06F 9/505 718/105 |
| 2012/0201130 | A1* | 8/2012 | Liu | H04L 12/5695 370/230 |
| 2013/0166842 | A1* | 6/2013 | Acuna | G06F 3/0605 711/114 |
| 2014/0007097 | A1* | 1/2014 | Chin | G06F 9/45533 718/1 |
| 2014/0115579 | A1 | 4/2014 | Kong | |
| 2015/0301759 | A1* | 10/2015 | Gu | H04L 67/1097 711/114 |

OTHER PUBLICATIONS

Gulati et al., "Pesto: Online Storage Performance Management in Virtualized Datacenters", Proceedings of the 2nd ACM Symposium on Cloud Computing, SOCC'11, ACM, Oct. 2011.

"Solving the Top Six Enterprise Storage Issues", Hitachi Data Systems, White Paper, Dec. 2007 http://book.itep.ru.depository/virtual/solving-top-six-enterprise-storage-issues-virtualization.pdf.

* cited by examiner

POLICY DRIVEN STORAGE HARDWARE ALLOCATION

FIELD OF THE INVENTION

The present invention relates generally to software defined storage, and specifically to a method for dynamically allocating storage resources from a reserve pool to a software defined storage controller.

BACKGROUND

Software-defined storage (SDS) is a computer data storage technology that separates storage hardware from the software that manages the storage infrastructure. Software managing a software-defined storage environment may also provide policy management for features such as deduplication, replication, thin provisioning, snapshots and backup. By definition, SDS software is separate from the hardware it is managing, and can be implemented via appliances over a traditional Storage Area Network (SAN), or implemented as part of a scale-out Network-Attached Storage (NAS) solution, or as the basis of an Object-based storage solution.

The description above is presented as a general overview of related art in this field and should not be construed as an admission that any of the information it contains constitutes prior art against the present patent application.

SUMMARY

There is provided, in accordance with an embodiment of the present invention a method, including assigning multiple storage resources to a reserve pool, defining one or more storage policy parameters, initializing a software defined storage (SDS) controller, allocating, from the reserve pool, one or more of the storage resources to the SDS controller, monitoring a current state of the SDS controller, and upon detecting that the state of the SDS controller meets a given storage policy parameter, allocating, by a computer, an additional storage resource from the reserve pool to the SDS controller.

There is also provided, in accordance with an embodiment of the present invention a data facility, including multiple storage resources, and a computer configured to assign the multiple storage resources to a reserve pool, to define one or more storage policy parameters, to initialize a software defined storage (SDS) controller, to allocate, from the reserve pool, one or more of the storage resources to the SDS controller, to monitor a current state of the SDS controller, and upon detecting that the state of the SDS controller meets a given storage policy parameter, to allocate an additional storage resource from the reserve pool to the SDS controller.

There is further provided, in accordance with an embodiment of the present invention a computer program product, the computer program product including a non-transitory computer readable storage medium having computer readable program code embodied therewith, the computer readable program code including computer readable program code configured to assign multiple storage resources to a reserve pool, computer readable program code configured to define one or more storage policy parameters, computer readable program code configured to initialize a software defined storage (SDS) controller, computer readable program code configured to allocate, from the reserve pool, one or more of the storage resources to the SDS controller, computer readable program code configured to monitor a current state of the SDS controller, and computer readable program code configured upon detecting that the state of the SDS controller meets a given storage policy parameter, to allocate, by a computer, an additional storage resource from the reserve pool to the SDS controller.

BRIEF DESCRIPTION OF THE DRAWINGS

The disclosure is herein described, by way of example only, with reference to the accompanying drawings, wherein.

DETAILED DESCRIPTION OF EMBODIMENTS

Enterprise-level storage controllers are typically required to provide high quality of service (QOS) levels. For example, a storage controller may have a QOS guaranteeing 99.99999% availability. In operation, there may be instances when a storage controller needs to add additional storage resources (e.g., disks and servers) in order to deal with issues such as hardware failures, low storage availability, performance decreases, and data redundancy requirements. When additional storage resources are needed, a human operator can assign the additional resources to the storage controller.

Embodiments of the present invention provide systems and methods for automatically managing a set of software defined storage (SDS) controllers and a separate pool of storage resources. In embodiments described herein a storage resource (also referred to herein simply as a resource) comprises a physical/logical/virtual storage entity such as a physical computer system (e.g., a server) a virtual computer system, a set of one or more physical storage devices, or a set of one or more logical or virtual storage devices.

As described hereinbelow, embodiments of the present invention can identify when an SDS controller requires one or more additional storage resources and automatically assign the required resources the SDS controller. The criteria for such decisions can include the SDS controller's capacity needs, its redundancy state, and the overall redundancy of the data center, as well as user-defined policies.

In some embodiments, a data center can be configured to implement embodiments of the present invention by assigning multiple storage resources to a reserve pool, and defining one or more storage policy conditions. Once the data center is configured, an SDS system can be initialized by allocating, from the reserve pool, one or more of the storage resources to the SDS system. At a subsequent time, upon detecting a given storage policy condition being met, an additional storage resource can be automatically allocated from the reserve pool to the SDS system.

Therefore, systems implementing embodiments of the present invention can enhance a given SDS system's capacity, performance and reliability. Additionally, systems implementing embodiments of the present invention can effect efficient utilization of hardware resources since (a) any spare resources can be shared between several clusters of SDS controllers, and (b) a storage resource in the pool can be shifted, when required, from a first SDS controller to a second SDS controller. Furthermore, systems implementing embodiments of the present invention can minimize service times by (a) identifying issues automatically, (b) enabling an automatic or semi-automatic allocation of resources to a given SDS controller, and (c) enabling policy driven allocation of storage resources.

Figure 1:
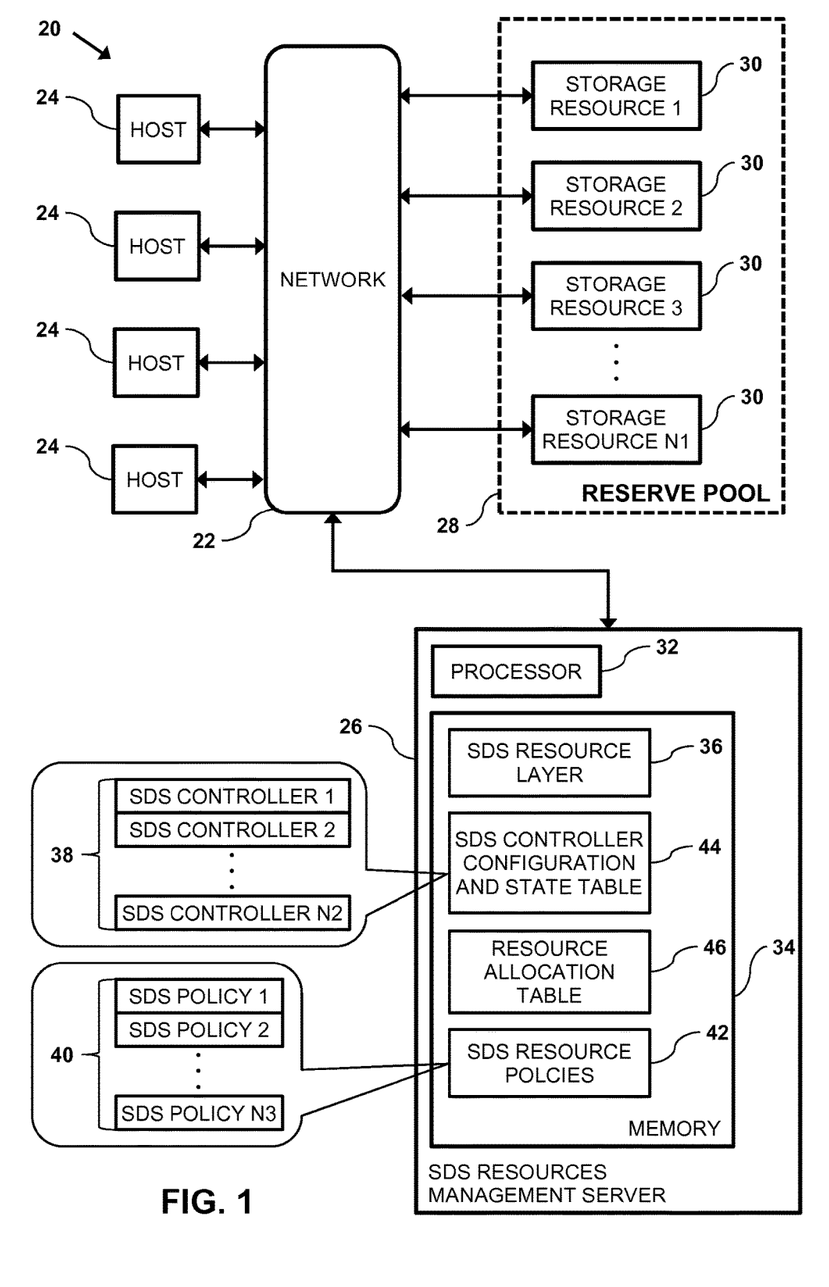
FIG. 1 is a block diagram that schematically illustrates a data facility configured to dynamically allocate storage resources from a reserve pool to a software defined storage controller, in accordance with an embodiment of the present invention.

FIG. 1 is a block diagram that schematically illustrates a data facility 20, in accordance with an embodiment of the invention. The particular facility and systems shown in FIG. 1 is presented to facilitate an explanation of the invention. However, as the skilled artisan will appreciate, the invention can be practiced using other computing environments, such as other storage systems with diverse architectures and capabilities.

Facility 20 comprises a network 22 that couples host computers 24 to a software defined storage (SDS) resources management server 26, and to a reserve pool 28 of storage resources 30. Examples of storage resources 30 include servers and "just a bunch of disks" (JBOD) configurations that are described in the descriptions referencing FIGS. 2, 3 and 4 hereinbelow. While the configuration in FIG. 1 shows resources 30 at a single site coupled to a single network 22, the storage resources may located at multiple sites and can communicate over multiple interconnected physical and/or virtual networks.

SDS resources management server 26 comprises a management processor 32 and a management memory 34. In operation, processor 32 executes an SDS resource layer 36 that configures and manages SDS controllers 38. In embodiments described herein, SDS resource layer 36 can manage a given SDS controller 38 by allocating one or more resources 30 from reserve pool 28 to a given SDS controller or deallocating one or more storage resources 30 from the given SDS controller back to the reserve pool.

For a given SDS controller 38, SDS resource layer 36 performs resource allocations and deallocations based on a current state of the given SDS controller and SDS policies 40 stored in SDS resource policies 42. In embodiments of the present invention, a given SDS resource policy 40 is typically defined by the user while the state of the SDS controller includes the measured or calculated state of the SDS system. A given SDS resource policy 40 comprises a user-defined condition that directs logic for allocating a given storage resource 30 to a given SDS controller 38 may also be referred to herein as an allocation policy (or allocation condition) 40, and a given SDS resource policy 40 that directs logic for deallocating a given storage resource 30 from a given SDS controller 38 may also be referred to herein as a deallocation policy (or deallocation condition) 40.

Additionally, SDS resources management server 26 stores definitions for SDS controllers 38 to an SDS controller configuration and state table 44, and stores a current allocation status of each resource 30 to a resource allocation table 46. The current allocation status for a given storage resource 30 can indicate if the given storage resource is unallocated (i.e., available for allocation) or is presently allocated to a given SDS controller 38.

In embodiments described herein, SDS resource layer 36 can allocate and deallocate storage resources 30 based on the current states of SDS controllers 28 and SDS policies 40 stored in SDS resource policies 42. Examples of states for a given SDS controller 38 include, but are not limited to:

A current storage capacity state, and a predicted (i.e., anticipated future) storage capacity.

A current performance (e.g., latency and IOPS) state and a predicted performance.

Current network performance (e.g., bandwidth) metrics and a current network performance state.

Spare storage capacity requirements.

A redundancy state (e.g., RAID).

A health/operational/reliability state of a given resource (or a subcomponent of the given resource) currently assigned to the given SDS controller.

As described supra, SDS resource policies 40 comprise user-defined conditions that direct logic for allocating a given storage resource 30 to a given SDS controller 38 or for deallocating a given storage resource 30 from a given SDS controller 38. In a first example, a given policy 40 may define a performance goal for a given SDS controller 38. In a second example, a given policy 40 may check if a given SDS controller 38 has been allocated an upper bound of storage resources 30. In a third example, a given policy 40 can define, for a set of SDS controllers 38, one or more priorities that can used to weight an allocation decision and thus prioritize resource allocations. Exact semantics of the policies are implementation dependent, but typically, the SDS resource layer logic can use the SDS controller state and the policies in order to reach an allocation/deallocation decision.

In embodiments of the present invention, SDS policies 40 for a given SDS controller 38 comprise storage parameters (also referred to herein as conditions) such as:

A capacity goal and/or a capacity quota for a given SDS controller 38.

A reliability goal (e.g., QOS) for a given SDS controller 38.

A performance goal for a given SDS controller 38.

A performance goal for network 22.

A priority weight for the given storage parameter in a given policy 40.

A maximum number (e.g., 15) of storage resources 30 that can be allocated to a given SDS controller 38.

In some embodiments, a given SDS policy may also include one or more rules that define which of the available resources 30 are applicable for the given SDS controller. For example, a rule may state that all the storage resources allocated to the given SDS controller may share a common attribute (e.g., all the storage resources are located in the same data center).

In operation, SDS resource layer 36 can make an allocation decision based on the states of the SDS controllers, the resources, and any relevant user-defined policies. For example, the SDS resource layer may identify a given SDS controller 38 whose current state indicates that its performance is below a given policy rule 40 for the given SDS controller, and assign a given resource 30 to the given SDS controller in order to improve performance. In an additional example, if there are two SDS controllers 38 both requiring additional resources 30, and there is a scarcity of available resources 30, SDS resource layer 36 can make a decision to move a given resource 30 from a first SDS controller 38 to a second SDS controller 38 because of a given policy 40 which sets different priorities for the first and the second SDS controllers.

In further embodiments, policies 40 can include parameters from the SDS controllers, priorities defined by the user, a state of the reserve pool, and any other available criteria. Additionally, SDS resource layer 36 can carry out any decisions defined by a given policy either automatically or semi-automatically (i.e., with user intervention).

Figure 2A:
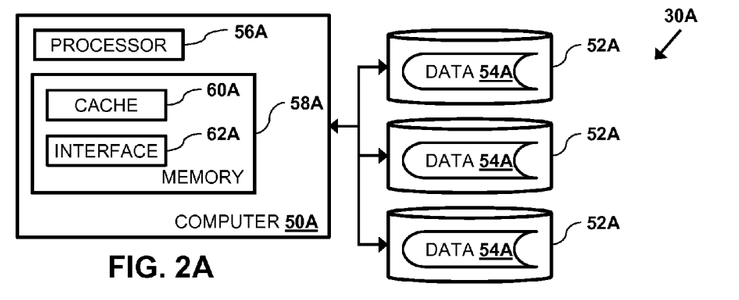
FIG. 2A is a block diagram that schematically illustrates a first example of a given storage resource, in accordance with an embodiment of the present invention.
Figure 2B:
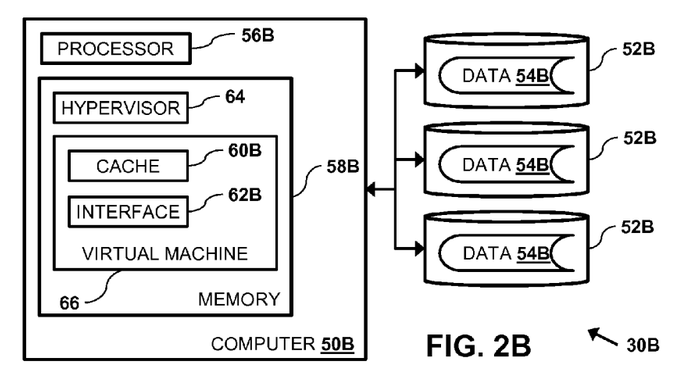
FIG. 2B is a block diagram that schematically illustrates a second example of a given storage resource, in accordance with an embodiment of the present invention.
Figure 2C:
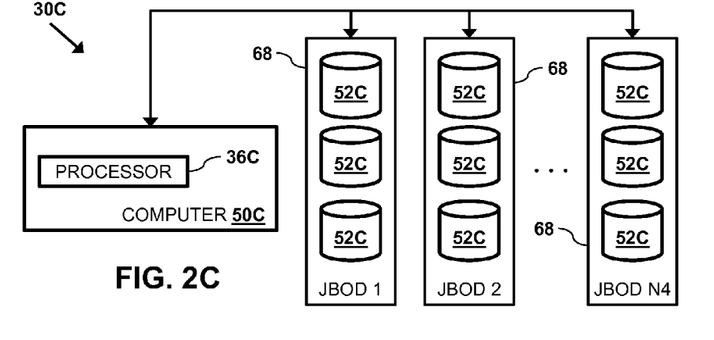
FIG. 2C is a block diagram that schematically illustrates a third example of a given storage resource, in accordance with an embodiment of the present invention.

FIG. 2A is a block diagram that schematically illustrates a first example of a given storage resource 30, FIG. 2B is a block diagram that schematically illustrates a second example of a given storage resource 30, and FIG. 2C is a block diagram that schematically illustrates a third example of a given storage resource 30 in accordance with an embodiment of the present invention. In the examples shown in FIGS. 2A-2C, storage resources 30 and their respective components can be differentiated by appending a letter to the identifying numeral, so that the storage resources comprise storage resources 30A (as shown in FIG. 2A), 30B (as shown in FIG. 2B), and 30C (as shown in FIG. 2C).

Each storage resource 30 comprises a computer 50 and one more storage devices 52 that store data 54. Each computer 50 comprises a resource processor 56 and in the configurations shown in FIGS. 2 and 3, computers 50A and 50B comprise a resource memory 58 that stores a cache 60, and an interface 62. In operation, processor 56 uses cache 60 and interface 62 to process I/O requests for data 54 stored on storage devices 52.

Storage devices 52 comprise multiple slow and/or fast access time mass storage devices, herein below assumed to be multiple hard disks. FIGS. 2 and 3 show cache 60 coupled to a set of storage devices 52. In some configurations, storage devices 52 comprise one or more hard disks, or solid state drives (SSDs) which can have different performance characteristics. In response to an I/O command, a given cache 60, by way of example, may read or write data at addressable physical locations of a given storage device 52. In the embodiments shown in FIGS. 2 and 3, cache 60 is able to exercise certain control functions over storage devices 52. These control functions may alternatively be realized by hardware devices such as disk controllers (not shown), which are linked to cache 60.

In some embodiments each of storage devices 52 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Interface 62 comprises a software application executed by processor 56 and configured to receive and process I/O requests from host computers 24. For example, if interface 62 in a first given resource 30 receives an I/O request comprising a request to read data from a logical block address (LBA) stored on s second given resource 30, the interface can forwards a one or more data requests for the LBA to the second given resource, and upon receiving the requested data from the second given resource, the interface forwards the received data (i.e., a result of the data request) to the given host computer.

In the configuration shown in FIG. 2B, processor 56B executes a hypervisor 64 from memory 58B, thereby enabling processor 56B to execute interface 62B (and store cache 60B) in one or more virtual machine instances 66. In embodiments where processors 56 implement virtual machines 66, facility 20 can implement SDS controllers 38 in a distributed set of the virtual machines. In some embodiments, computer 50B can implement a virtual storage device that can be presented as a given storage device 52 within virtual machine 66, but is implemented by the hypervisor as a different type of storage entity (e.g., a file).

Storage resource 30C (FIG. 2C) comprises a JBOD server comprising one or more JBOD pools 68, each of the JBOD pools comprising multiple storage devices 52C. In operation, SDS resource layer 36 can allocate a given JBOD pool 68 to a given SDS controller 38, or deallocate a given JBOD pool 68 from the given SDS controller. While the example in FIG. 2C shown storage resource 30C configured as a JBOD server, any other configuration for a storage resource 30 that can manage one or more sets of storage devices 52 that can be allocated/deallocated is considered to be within the spirit and scope of the present invention.

Additionally, while the configuration in FIG. 1 shows SDS resources management server 26 allocating and deallocating storage resources 30 based on policies 40, the controlling logic (and the functionality of embodiments described herein) for allocating and deallocating the storage resources can be either centralized on a single storage resource 30 or distributed among multiple storage resources 30. Therefore, the functionality of SDS resources management server 26 can be implemented in one or more SDS controllers 38 that are configured to allocate and/or deallocate storage resources 30. In some embodiments, the functionality of SDS resources management server 26 can also be completely distributed so that each SDS controller 38 is also making allocation decisions for itself based on a common state of the SDS controllers and policies 40.

In embodiments of the present invention, the configuration of storage resources 30A and 30B (i.e., computers 50A, 50B and their respective storage devices 52A and 52B) may also be referred to herein as storage servers. Likewise, storage resource 30C may also be referred to as a set of storage devices 52. In the configuration shown in FIG. 3C, each JBOD pool 68 (i.e., each set of the storage devices) can be allocated separately as a distinct storage resource 30.

Processors 32 and 56 comprise general-purpose central processing units (CPU) or special-purpose embedded processors, which are programmed in software or firmware to carry out the functions described herein. The software may be downloaded to SDS resources management server 26 and computers 50 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

STORAGE RESOURCE MANAGEMENT

Figure 3:
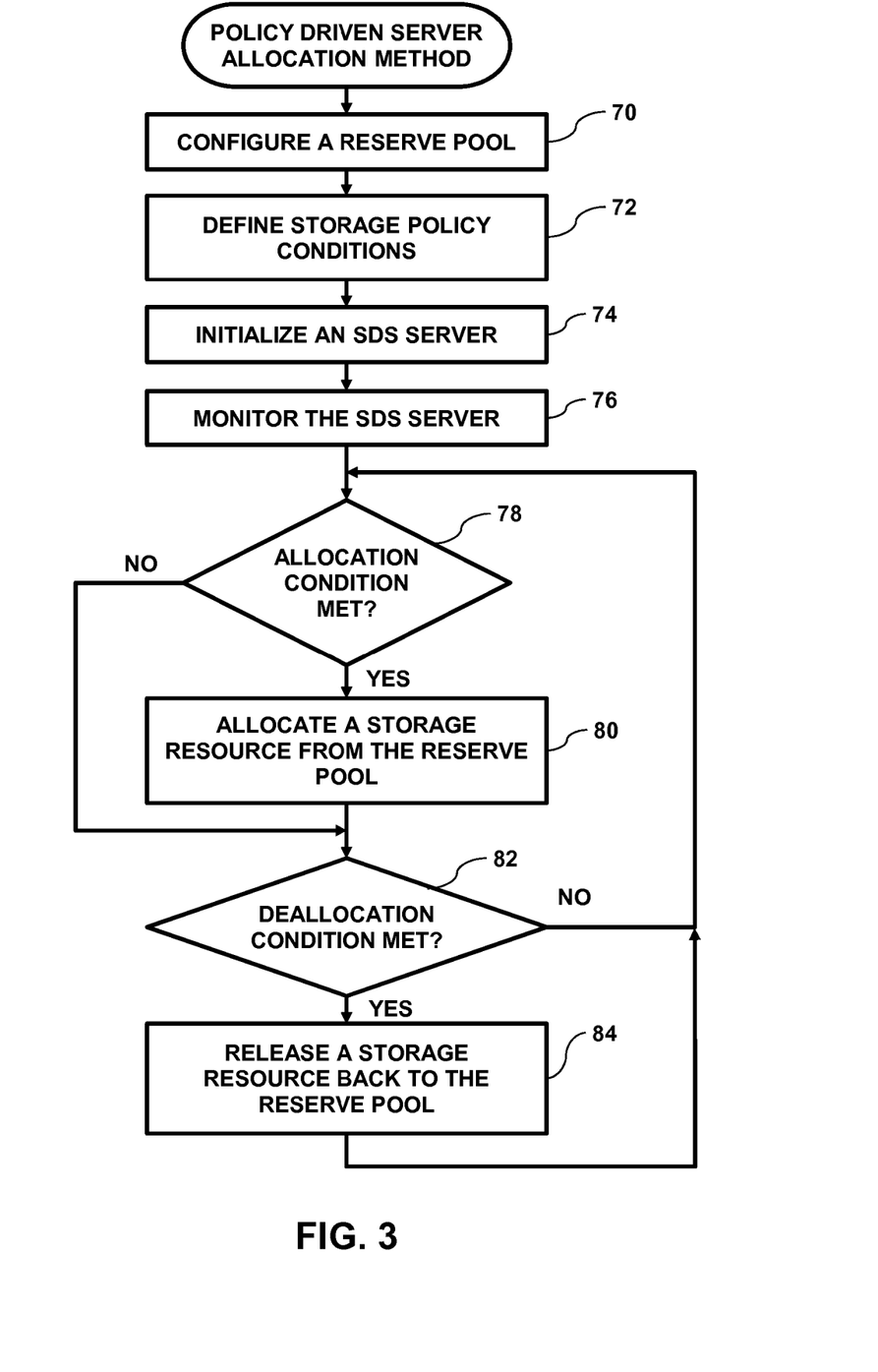
FIG. 3 is a flow diagram that schematically illustrates a method of dynamically allocating storage resources from a reserve pool to a software defined storage controller, in accordance with an embodiment of the preset invention.

FIG. 3 is a flow diagram that schematically illustrates a method of policy driven allocation and deallocation of storage resources 30, in accordance with an embodiment of the current invention. In a configuration step 70, processor 32 configures reserve pool 28 comprising storage resources 30, and a definition step 72, the management processor stores storage policy conditions 40 to SDS resource policies 42, thereby defining the allocation and deallocation conditions for facility 20. Processor 32 can retrieve policy parameters 40 from a file (not shown) or receive the policy parameters as input from a user.

In an initialization step 74, processor 32 initializes (i.e., defines) a given SDS controller 38 by allocating one or more storage resources 30 to the given SDS controller, and in a monitoring step 76, the management processor starts using SDS policies 40 to monitor a state of the given SDS controller. In the flow diagram shown in FIG. 3 processor 32 monitors the given SDS controller by performing steps 78-84 described hereinbelow.

In a first condition step 78, if processor 32 detects that a current state of the given SDS controller meets a given allocation condition 40, then in an allocation step 80, the management processor allocates, from reserve pool 28, a given storage resource 30 to the given SDS controller. For example, the given SDS controller may be running out of storage space, or one of the storage devices in the given SDS controller may be starting to fail. In some embodiments, the decision in step 78 may be a relative decision. SDS resource layer 36 can make a relative decision when the decision is based on the relative value of a calculated evaluation function for all SDS controllers 38.

In a second condition step 82, if processor 32 detects that the current state of the given SDS controller meets a given deallocation condition 40, then in an deallocation step 84 the management processor deallocates a given storage resource 30 from the given SDS controller, returns the deallocated storage resource to reserve pool 28, and the method continues with step 78. For example, if the given SDS resource previously had a RAID 1 configuration and now is reconfigured to have no data redundancy, management processor 32 may be able to deallocate one or more storage resources 30 from the given SDS controller.

Returning to step 82, if processor 32 does not detect that the current state of the given SDS controller meets a given deallocation condition 40, then the method continues with step 78. Returning to step 78, if processor 32 does not detect that the current state of the given SDS controller meets a given allocation condition 40, then the method continues with step 82.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   assigning multiple storage resources from multiple nodes of a computing cluster to a reserve pool, the multiple storage resources each comprising respective storage servers; wherein the reserve pool comprises a storage pool of the multiple storage resources which is separate from currently allocated storage resources to the computing cluster;
   defining one or more storage policy parameters;
   initializing a software defined storage (SDS) controller, the SDS controller comprising a distinct hardware computing entity controlling the computing cluster;
   allocating, from the reserve pool, one or more of the storage resources comprising one or more of the storage servers to the SDS controller;
   monitoring a current state of the SDS controller; and
   upon detecting that the state of the SDS controller meets a given storage policy parameter, allocating, by a computer, an additional storage resource comprising an additional storage server from the reserve pool to the SDS controller; wherein, upon determining that no additional storage resources exist in the reserve pool, the additional storage resource is migrated to the SDS controller from an alternative SDS controller according to a priority of the given storage policy parameter with respect to the SDS controller and the alternative SDS controller.

2. The method according to claim 1, wherein each of the multiple storage resources further comprises a set of storage devices.

3. The method according to claim 1, wherein the state is selected from a list consisting of a capacity state, a capacity prediction, a performance state, a performance prediction, network performance metrics, a network performance state, a health state, a redundancy state and a reliability state.

4. The method according to claim 1, wherein the given storage parameter is selected from a list consisting of a capacity goal, a capacity quota, a reliability goal, a network performance goal and a priority weight.

5. The method according to claim 1, wherein the given storage parameter defines an availability of a given storage resource to the SDS controller.

6. The method according to claim 1, wherein the given storage policy parameter comprises a first given storage policy parameter, and comprising releasing, from the given SDS controller, a given storage resource to the storage pool upon the state of the SDS controller meeting a second storage policy parameter.

7. The method according to claim 1, wherein the computer is selected from a list consisting of a policy server and one or more of the SDS controllers.

8. A data facility, comprising:
   multiple storage resources; and
   a computer configured:
   to assign the multiple storage resources from multiple nodes of a computing cluster to a reserve pool, the multiple storage resources each comprising respective storage servers; wherein the reserve pool comprises a storage pool of the multiple storage resources which is separate from currently allocated storage resources to the computing cluster;
   to define one or more storage policy parameters;
   to initialize a software defined storage (SDS) controller, the SDS controller comprising a distinct hardware computing entity controlling the computing cluster;
   to allocate, from the reserve pool, one or more of the storage resources comprising one or more of the storage servers to the SDS controller;
   to monitor a current state of the SDS controller; and
   upon detecting that the state of the SDS controller meets a given storage policy parameter, to allocate an additional storage resource comprising an additional storage server from the reserve pool to the SDS controller; wherein, upon determining that no additional storage resources exist in the reserve pool, the additional storage resource is migrated to the SDS controller from an alternative SDS controller according to a priority of the given storage policy parameter with respect to the SDS controller and the alternative SDS controller.

9. The data facility according to claim 8, wherein each of the multiple storage resources further comprises a set of storage devices.

10. The data facility according to claim 8, wherein the state is selected from a list consisting of a capacity state, a capacity prediction, a performance state, a performance prediction, network performance metrics, a network performance state, a health state, a redundancy state and a reliability state.

11. The data facility according to claim 8, wherein the given storage parameter is selected from a list consisting of a capacity goal, a capacity quota, a reliability goal, a network performance goal and a priority weight.

12. The data facility according to claim 8, wherein the given storage parameter defines an availability of a given storage resource to the SDS controller.

13. The data facility according to claim 8, wherein the given storage policy parameter comprises a first given storage policy parameter, and wherein the computer is configured to release, from the given SDS controller, a given storage resource to the storage pool upon the state of the SDS controller meeting a second storage policy parameter.

14. The data facility according to claim 8, wherein the computer comprises one or more of the SDS controllers.

15. A computer program product, the computer program product comprising:
    a non-transitory computer readable storage medium having computer readable program code embodied therewith, the computer readable program code comprising:
    computer readable program code configured to assign multiple storage resources from multiple nodes of a computing cluster to a reserve pool, the multiple storage resources each comprising respective storage servers; wherein the reserve pool comprises a storage pool of the multiple storage resources which is separate from currently allocated storage resources to the computing cluster;
    computer readable program code configured to define one or more storage policy parameters;
    computer readable program code configured to initialize a software defined storage (SDS) controller, the SDS controller comprising a distinct hardware computing entity controlling the computing cluster;
    computer readable program code configured to allocate, from the reserve pool, one or more of the storage resources comprising one or more of the storage servers to the SDS controller;
    computer readable program code configured to monitor a current state of the SDS controller; and
    computer readable program code configured upon detecting that the state of the SDS controller meets a given storage policy parameter, to allocate, by a computer, an additional storage resource comprising an additional storage server from the reserve pool to the SDS controller; wherein, upon determining that no additional storage resources exist in the reserve pool, the additional storage resource is migrated to the SDS controller from an alternative SDS controller according to a priority of the given storage policy parameter with respect to the SDS controller and the alternative SDS controller.

16. The computer program product according to claim 15, wherein each of the multiple storage resources further comprises a set of storage devices.

17. The computer program product according to claim 15, wherein the state is selected from a list consisting of a capacity state, a capacity prediction, a performance state, a performance prediction, network performance metrics, a network performance state, a health state, a redundancy state and a reliability state.

18. The computer program product according to claim 15, wherein the given storage parameter is selected from a list consisting of a capacity goal, a capacity quota, a reliability goal, a network performance goal and a priority weight.

19. The computer program product according to claim 15, wherein the given storage parameter defines an availability of a given storage resource to the SDS controller.

20. The computer program product according to claim 15, wherein the given storage policy parameter comprises a first given storage policy parameter, and comprising computer readable program code configured to release, from the given SDS controller, a given storage resource to the storage pool upon the state of the SDS controller meeting a second storage policy parameter.

* * * * *